United States Patent [19]

Woon et al.

[11] Patent Number: 4,770,090

[45] Date of Patent: Sep. 13, 1988

[54] COFFEE- OR TEA-MAKING MACHINE

[75] Inventors: Chan K. Woon, West Point; Max T. D. von der Lühe, Hong Kong, both of Hong Kong

[73] Assignee: Melitta-Werke Bentz & Sohn, Mindem, Fed. Rep. of Germany

[21] Appl. No.: 923,331

[22] Filed: Oct. 27, 1986

[30] Foreign Application Priority Data

Oct. 28, 1985 [DE] Fed. Rep. of Germany ....... 3538245

[51] Int. Cl.⁴ ...................... A47J 31/04; A47J 31/057
[52] U.S. Cl. ......................................... 99/279; 99/295
[58] Field of Search ................. 99/279, 295, 280–285, 99/288, 290, 300, 304, 307, 316; D7/305, 309, 310, 400

[56] References Cited

U.S. PATENT DOCUMENTS

| | | | |
|---|---|---|---|
| D. 243,499 | 3/1977 | Julkenbeck | D7/309 |
| 3,139,344 | 6/1964 | Weisman | 99/295 |
| 3,518,933 | 7/1970 | Weber | 99/283 |
| 3,793,933 | 2/1974 | Weber | 99/283 |
| 4,155,292 | 5/1979 | Rickert | 99/307 X |
| 4,328,740 | 5/1982 | McDonough et al. | 99/285 X |
| 4,495,404 | 1/1985 | Carmichael | 99/279 X |
| 4,634,838 | 1/1987 | Berz | 99/288 |
| 4,674,400 | 6/1987 | Rondel et al. | 99/279 |

Primary Examiner—Stanley N. Gilreath
Assistant Examiner—Lynn M. Sohacki
Attorney, Agent, or Firm—Erwin S. Teltscher

[57] ABSTRACT

A coffee- or tea-making machine is to be constructed so that its space-occupancy during non-use is considerably smaller than its space occupancy during use. For this purpose the maximum inner width, or alternately inner diameter of the receptacle for the filtrate is larger than the outer maximum width, or alternately, outer diameter of the filter container above a supporting flange of the filter container. The fresh-water container of the coffee- or tea-making machine has a base surface which corresponds at least to that of the receptacle, and the inner height of the fresh-water container corresponds at least to the combined height of the receptacle and of the filter container, when the filter container is inserted into the receptacle in a position reverse from a normal operating position of the filter container. By means of these features the filter container and the receptacle can be stored during non-use of the coffee- or tea-making machine in the fresh-water container, so that the space occupancy of the coffee- or tea-making machine during non-use is considerably smaller than during use thereof when coffee or tea is filtered.

3 Claims, 4 Drawing Sheets

COFFEE- OR TEA-MAKING MACHINE

BACKGROUND OF THE INVENTION

The present invention relates to a coffee- or tea-making machine which includes a base, a container adapted to contain fresh water, and which has a discharge conduit, a heater adapted to heat the fresh water, which is adapted for passing the heated fresh water to the discharge conduit, a receptacle being adapted for receiving the fresh water converted to coffee or tea from the discharge conduit, a filter container which has a supporting flange, and wherein the supporting flange supports the filter container near a rim thereof in an operating position of the filter container.

Coffee- or tea-making machines of the above-noted kind are known in manifold implementations.

Coffee- or tea-making machines of this type have hitherto been constructed in such a manner that the space they occupy is invariant, namely they occupy exactly the same space during use as during non-use.

This is of subordinate value, as long as a coffee- or tea-making machine of this type occupies a certain, and more-or-less predetermined location in the kitchen, and wherein this space is not urgently required for any other kitchen work.

If, however, the question of space occupancy during non-use of the machine is of significant importance, be it either because of the location of use insufficient space is available, or if it is desired to take a machine of this type along for any journeys, coffee- or tea-making machines of the hitherto known type can no longer be considered satisfactory.

SUMMARY OF THE INVENTION

It is accordingly a principal object of the present invention to so design a coffee- and or tea-making machine of the aforedescribed kind, that its space occupancy during non-use is considerably smaller than its space occupancy during operation thereof.

This object is attained by a coffee- or tea-making machine of the aforesaid type, which includes a base, a container adapted to contain fresh water, and having a discharge conduit, heating means adapted to heat the fresh water, and for passing the heated fresh water to the discharge conduit, a receptacle adapted for receiving the fresh water converted to coffee or tea from the discharge conduit, a filter container having a supporting flange, the supporting flange supporting the filter container near a rim thereof in an operating position of the filter container, by requiring the receptacle to have a maximum inner width exceeding a maximum outer width of the filter container above the supporting flange, by the fresh water container having a base surface area corresponding at least to that of the receptacle, by an inner height of the fresh water container corresponding at least to a combined height of the receptacle and the filter container when the filter container is inserted into the receptacle in a position reverse from a normal operating position of the filter container.

A coffee- or tea-making machine of this type offers the advantage that the filter container and the receptacle for coffee or tea may be stowed in the fresh water container during non-use of the coffee- or tea-making machine, so that the space occupancy of such a coffee- or tea-making machine during its non-use is considerably less that its space occupancy during operation thereof.

It is further advantageous if the inner width of the receptacle is an inner diameter thereof, and if the maximum outer width of the filter container is an outer diameter thereof.

In a further development of the invention the filter container further includes a cover disc provided with a throughgoing opening, and having an outer diameter smaller than the inner diameter of the receptacle.

It is further desirable if a tube is provided, which extends upwardly in an operating position thereof, has upper and lower portions, and communicates with a lower end thereof with the discharge conduit, and if there is further provided an overflow tube rigidly connected with the upper tube portion, and wherein the upper tube portion s axially displaceable, and rotatable with respect to the lower tube portion.

In a further advantageous development the overflow tube is pivotable and lowerable into the interior of the fresh water container in a non-operating position of the overflow tube.

It is further desirable if the freshwater container additionally includes a cover hingeably attached thereto for closing the freshwater container.

The heating means is further advantageously adapted to pass the fresh water therethrough.

BRIEF DESCRIPTION OF THE DRAWING

The drawing illustrates a preferred embodiment of the invention, illustrated in further detail in what follows.

DESCRIPTION OF THE PREFERRED EMBODIMENT

Figure 1:
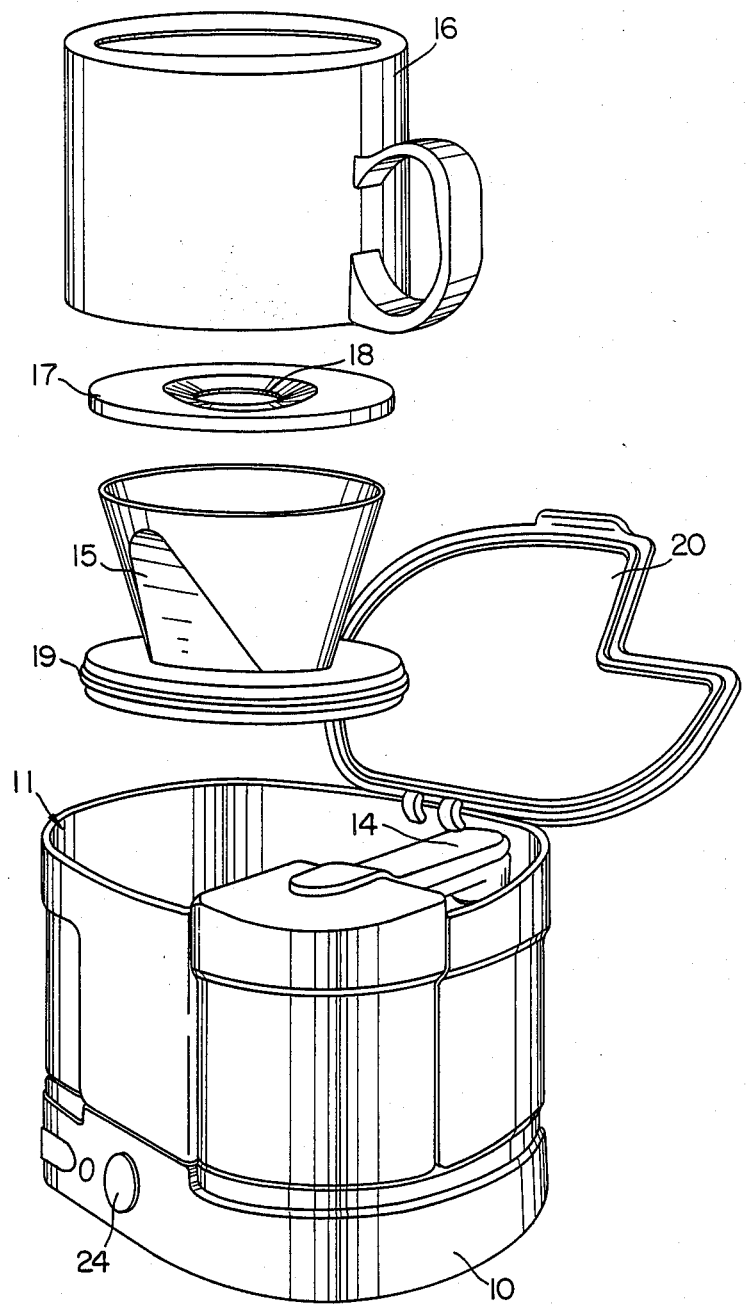
FIG. 1 is an exploded view in perspective of the coffee- or tea-making machine, according to the present invention.

The coffee- or tea-making machine illustrated in the drawing includes a base 10, which receives in a known manner, a heater 101 adapted for passing liquid therethrough.

A fresh-water container 11 is mounted on the base 10. The fresh-water container 11 is provided at its lowermost location with a discharge conduit 12, which communicates with the liquid passage in the aforesaid heater.

An upwardly extending tube 13 communicates with the discharge conduit 12 of the aforesaid liquid passage which, in turn, communicates with an overflow tube 14.

The coffee- or tea-making machine further includes a filter container 15 and a receptacle 16 for receiving the prepared beverage.

A cover disc 17, which is formed with an opening 18, is placed onto the filter container 15.

Figure 5:
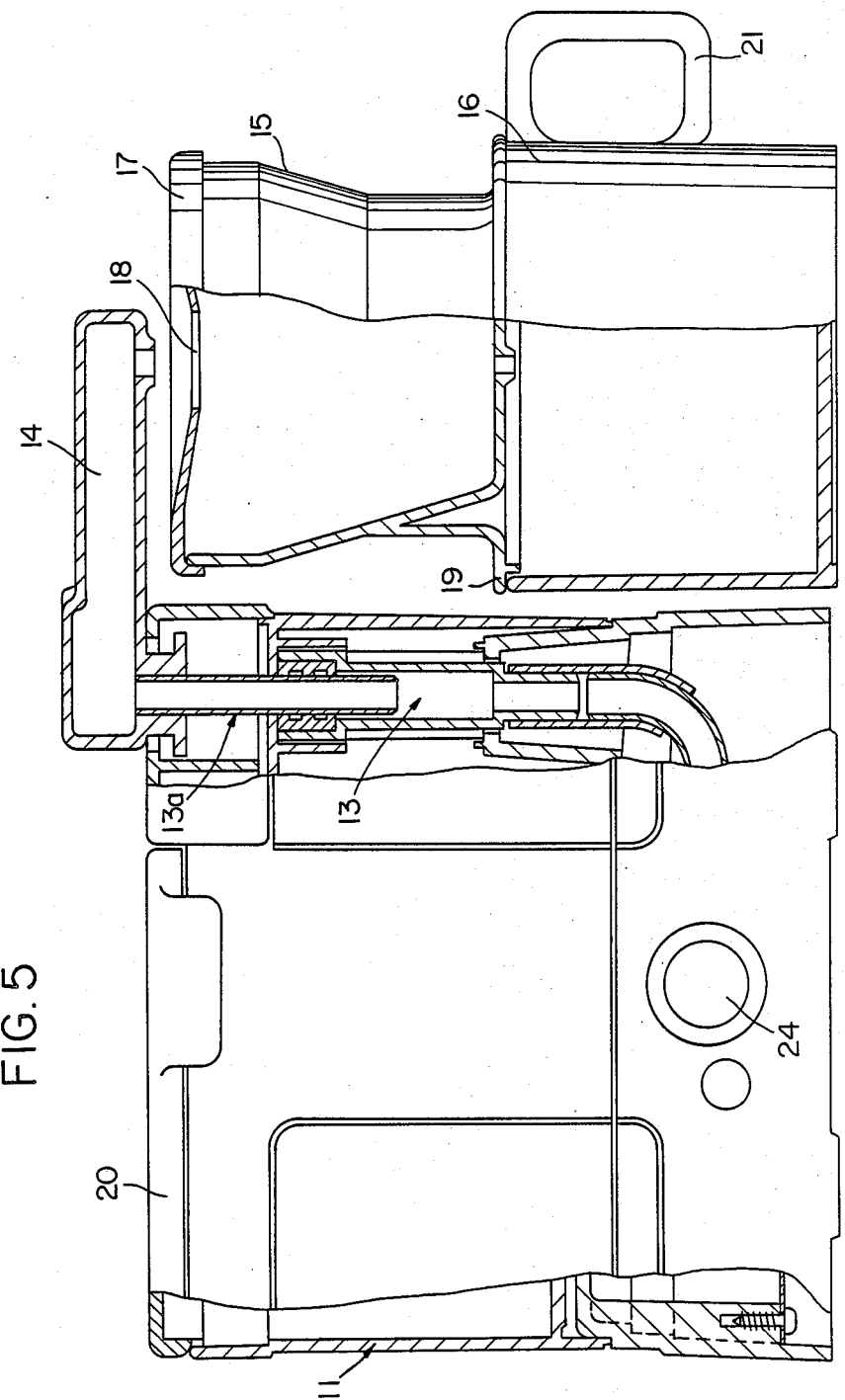
FIG. 5 is a front elevation view of the coffee- or tea-making machine in its operative state, and partially depicted in cross-section.

As can be particularly clearly seen from FIG. 5, the filter container 15 is provided at its lower end, as seen in an operating position thereof, with a supporting flange 19, which supports the filter container 15 near a rim thereof.

As is also shown in FIG. 5, the upwardly extending tube 13 is formed in two parts; its upper part 13a, which is rigidly connected with the overflow tube 14, is telescopically slidable with respect to the lower part of the tube 13, and is rotatable about its longitudinal axis.

The upper side of the fresh water container 11 is closable by a cover 20 hinged thereonto.

The inner maximum width, or, in a preferred embodiment, the inner diameter of the receptacle 16, is larger than the outer maximum width, or in a preferred embodiment, the outer maximum diameter of the filter container 15 above its supporting flange 19, and also larger than the outer diameter of the cover 17. In this manner it is possible to introduce the filter container 15 together with its covering disc 17, in a position reversed compared to the operating position thereof, into the receptacle 16. It will be understood, of course, that while a circular configuration of the receptacle, filter container and cover is a preferred embodiment, other, for example, polygonal configuration, such as an octogonal perimeter, are equally possible.

The surface area of the base of the fresh water container 11 corresponds to, but preferably exceeds that of the surface area of the base of the receptacle 16, and the inner height of the fresh water container 11 corresponds at least to the height of a combination of the receptacle 16, together with the filter container 15, when the latter is inserted in the aforesaid reverse position thereof into the receptacle 16.

Figure 3:
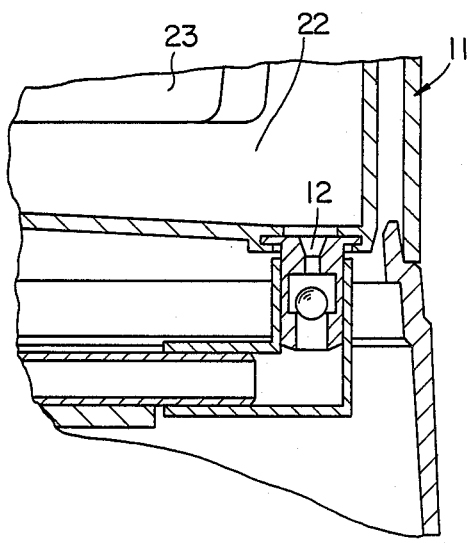
FIG. 3 is a fragmentary cross-section along the line III—III of FIG. 4.
Figure 4:
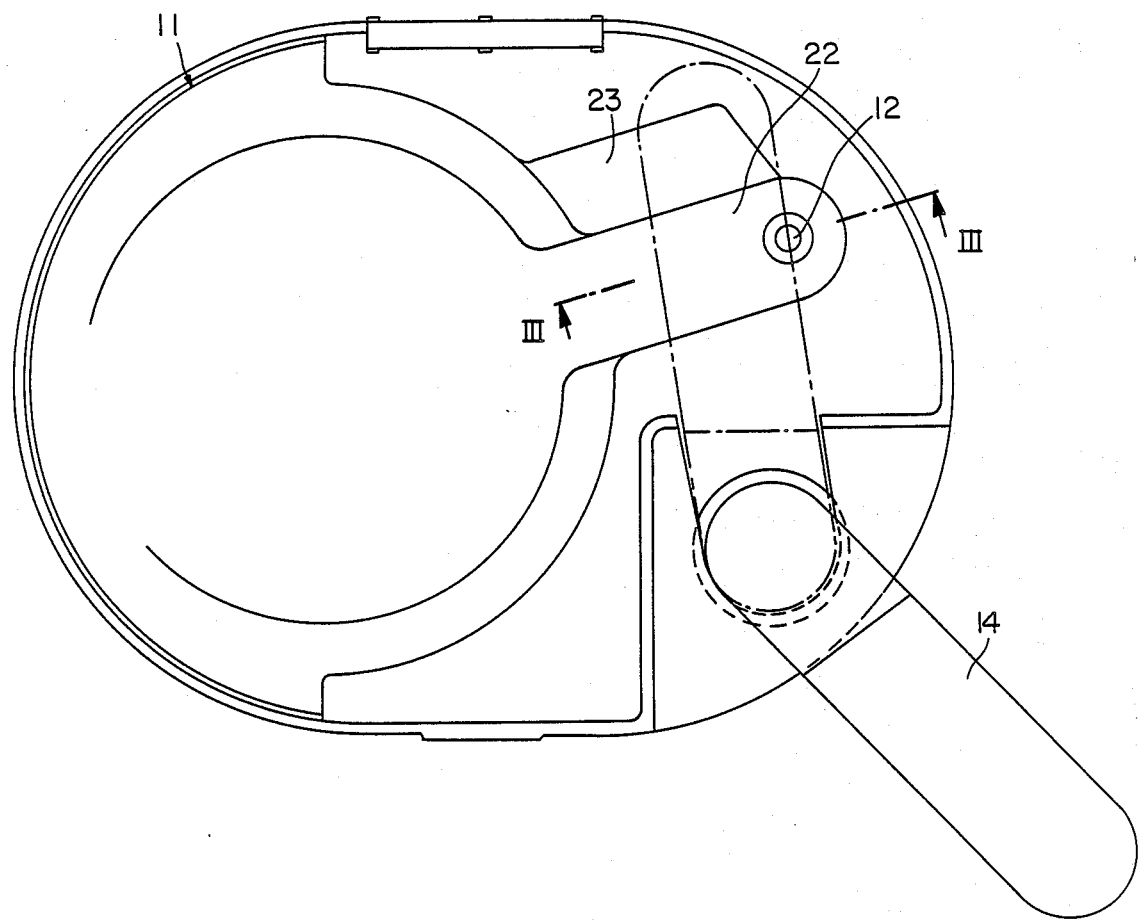
FIG. 4 is a top plan view in the direction of the arrow IV of FIG. 2, shown without a cover and without any filter receptacle or receiving receptacle.

As can be seen particularly clearly from FIGS. 3 and 4, the fresh water container 11 is formed in its interior with a recess 22, which corresponds to a projection surface of a handle 21 secured to the receptacle 16. Next to the recess 22 there is located another "grip recess" 23.

By the aforedescribed features of the coffee- or tea-making machine shown in the preceding Figs., it is possible to store the receptacle 16 together with the filter container 15 during non-use in the fresh water container 11. It is possible to first insert the filter container 15 with its cover 17 into the fresh water container 11, and then to place the receptacle 16 thereover, as has been indicated in FIG. 1. It is alternately possible to insert the filter container 15 in a reverse position into the receptacle 16, and then to place the receptacle 16 in its operating position into the fresh water container 11.

The overflow tube 14 can, in the case of non-use of the coffee- or tea-making machine, also be brougth into the region of the fresh water container 11, as is indicated in FIG. 4. Due to the aforedescribed telescopic construction of the overflow tube 14, the overflow tube 14 and the tube portion 13a connected thereto, can be lowered by a downward axial displacement of the tube portion 13a, following a pivoting thereof, into the interior space of the freah water container 11, to such an extent that the overflow tube 14 no longer projects beyond the upper border of the fresh water container 11.

Figure 2:
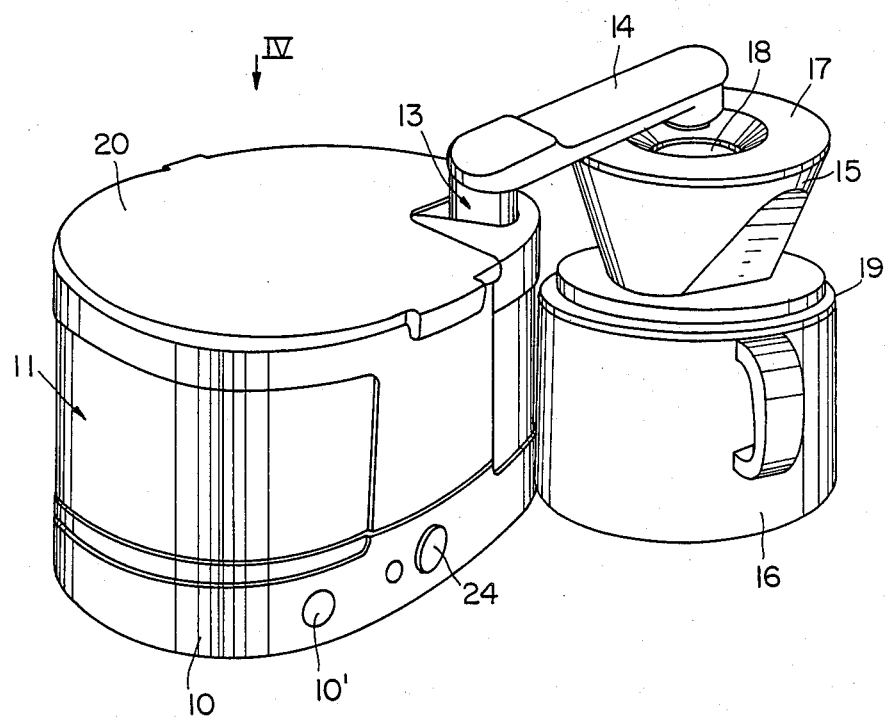
FIG. 2 is a perspective view of the coffee- or tea-making machine according to FIG. 1, in an operative state.

Operation of the coffee- or tea-machine, according to the present invention, is achieved in a manner opposite to the aforedescribed process, i.e. after opening of the cover 20 at first the overflow tube 14 is raised, and pivoted out of the region of the fresh water container 11. Thereafter the receptacle 16, together with the filter container 15 and the cover disc 17, are removed, and placed into an operating position shown in FIG. 2, after the filter container 15 has filled with coffee or tea.

The fresh water container 11 is filled with the desired amount of water, and following actuation of the ON-OFF switch 24, the coffee- or tea-making machine is ready to operate.

While the present invention has been described and illustrated herein as embodied in a specific construction of a coffee- or tea-making machine, it is not limited to the details of this particular construction, since various modifications and structural changes are possible and contemplated by the present invention. Thus the scope of the present invention will be determined exclusively by the appended claims.

We claim:

1. A coffee- or tea-making machine comprising in combination
   a base;
   a container adapted to contain fresh water, and having a discharge conduit,
   heating means arranged in said base and adapted to heat the freah water, and for passing the heated fresh water to said discharge conduit,
   a tube which extends upwardly in an operating position thereof, has upper and lower poritions, and communicates at a lower end thereof with said discharge conduit,
   an overflow tube rigidly connected with said upper tube portion, said upper tube portion being axially displaceable and rotatable with respect to said lower tube portion,
   a receptacle adapted for receiving the fresh water converted to coffee or tea from said overflow tube,
   a filter container having a flange for supporting the filter container on said receptacle
   said receptacle having a maximum inner width exceeding a maximum outer width of said filter container above said supporting flange, said fresh water container having a base surface area corresponding at least to that of said receptacle, an inner height of said fresh water container corresponding at least to a combined height of said receptacle and said filter container when said filter container is inserted into said receptacle in a position reverse from a normal operating position of said filter container,
   said overflow tube being pivotable and lowerable into the interior of said fresh water container in a non- operating position of said overflow tube.

2. A coffee- or tea-making machine according to claim 1, wherein said freshwater container further comprises a cover hingeably attached thereto for closing said freshwater container.

3. A coffee- or tea-making machine according to claim 1, wherein said heating means is adapted to pass the fresh water therethrough.

* * * * *